United States Patent
Kimura

(10) Patent No.: US 11,076,055 B2
(45) Date of Patent: Jul. 27, 2021

(54) CONTROL APPARATUS DETECTS AN ERROR IN IMAGE PROCESSOR AND REBOOTS THE IMAGE PROCESSOR BEFORE TRANSMITS PRINTING DATA TO PRINTING APPARATUS

(71) Applicant: CANON KABUSHIKI KAISHA, Tokyo (JP)

(72) Inventor: Yusuke Kimura, Abiko (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/397,244

(22) Filed: Jan. 3, 2017

(65) Prior Publication Data

US 2017/0208186 A1  Jul. 20, 2017

(30) Foreign Application Priority Data

Jan. 19, 2016 (JP) .............................. JP2016-007831
Jun. 15, 2016 (JP) .............................. JP2016-118926

(51) Int. Cl.
*H04N 1/00* (2006.01)
*G06F 3/12* (2006.01)
(Continued)

(52) U.S. Cl.
CPC ......... *H04N 1/00084* (2013.01); *G06F 3/121* (2013.01); *G06F 3/1204* (2013.01);
(Continued)

(58) Field of Classification Search
None
See application file for complete search history.

(56) References Cited

U.S. PATENT DOCUMENTS 6,256,750 B1 * 7/2001 Takeda .................... G06F 3/121
714/11
7,271,924 B1 * 9/2007 Takamizawa ........... G06F 3/121
358/1.1
(Continued)

FOREIGN PATENT DOCUMENTS

JP  H08202515 A  8/1996
JP  2005269421 A  9/2005
(Continued)

OTHER PUBLICATIONS

Office Action issued in Japanese Patent Application No. 2016-118926 dated Feb. 10, 2020.

*Primary Examiner* — Haris Sabah
(74) *Attorney, Agent, or Firm* — Rossi, Kimms & McDowell LLP

(57) ABSTRACT

An information processing apparatus that is capable of resuming an interrupted process without applying the time and effort more than needed to a user. A data transmission unit transmits execution data to a process execution apparatus. A detection unit detects an abnormal state of the information processing apparatus. A reboot unit reboots the information processing apparatus. An obtaining unit obtains an execution condition of the execution data by the process execution apparatus. The reboot unit reboots the information processing apparatus when the detection unit detects the abnormal state of the information processing apparatus. The transmission unit transmits the execution data to the process execution apparatus based on the execution condition obtained by the obtaining unit when the information processing apparatus was rebooted.

14 Claims, 13 Drawing Sheets

(51) Int. Cl.
*G06F 1/3203* (2019.01)
*G06F 1/26* (2006.01)
*G06K 15/00* (2006.01)
*G06F 9/4401* (2018.01)

(52) U.S. Cl.
CPC .......... G06F 3/1234 (2013.01); G06F 3/1285 (2013.01); H04N 1/0001 (2013.01); H04N 1/00037 (2013.01); G06F 1/26 (2013.01); G06F 1/3203 (2013.01); G06F 9/4418 (2013.01); G06K 15/4055 (2013.01); H04N 1/00928 (2013.01)

(56) References Cited

U.S. PATENT DOCUMENTS

| | | | |
|---|---|---|---|
| 7,454,476 B2* | 11/2008 | Kim | G06F 11/0709 358/1.14 |
| 8,619,290 B2 | 12/2013 | Yonezawa et al. | |
| 2004/0165204 A1* | 8/2004 | Fujiwara | H04L 67/36 358/1.13 |
| 2010/0141986 A1* | 6/2010 | Utsubo | G06F 3/121 358/1.15 |
| 2011/0035624 A1* | 2/2011 | Miller | G06F 11/0793 714/15 |
| 2011/0157626 A1* | 6/2011 | Park | G06F 3/122 358/1.15 |
| 2012/0206761 A1* | 8/2012 | Uotani | G06F 3/1203 358/1.15 |
| 2012/0229839 A1* | 9/2012 | Goda | G06K 15/4055 358/1.14 |
| 2014/0146340 A1* | 5/2014 | Takayama | G06K 15/402 358/1.14 |
| 2014/0368862 A1* | 12/2014 | Ooba | G06F 3/1221 358/1.14 |
| 2015/0103375 A1* | 4/2015 | Mihira | G06F 3/1288 358/1.15 |
| 2015/0153972 A1* | 6/2015 | Oba | G06F 3/1221 358/1.14 |
| 2015/0277810 A1* | 10/2015 | Fukasawa | G06F 3/126 358/1.15 |
| 2016/0154613 A1* | 6/2016 | Okubo | G06F 3/121 358/1.15 |
| 2016/0179447 A1* | 6/2016 | Ochi | G06F 3/1259 358/1.15 |
| 2016/0274919 A1* | 9/2016 | Masuyama | H04N 1/00928 |

FOREIGN PATENT DOCUMENTS

| | | |
|---|---|---|
| JP | 2011040043 A | 2/2011 |
| JP | 2012168634 A | 9/2012 |

* cited by examiner

| JOB ID | JOB NAME |
|---|---|
| 1 | BOOKLET 1 |
| 2 | BOOKLET 2 |

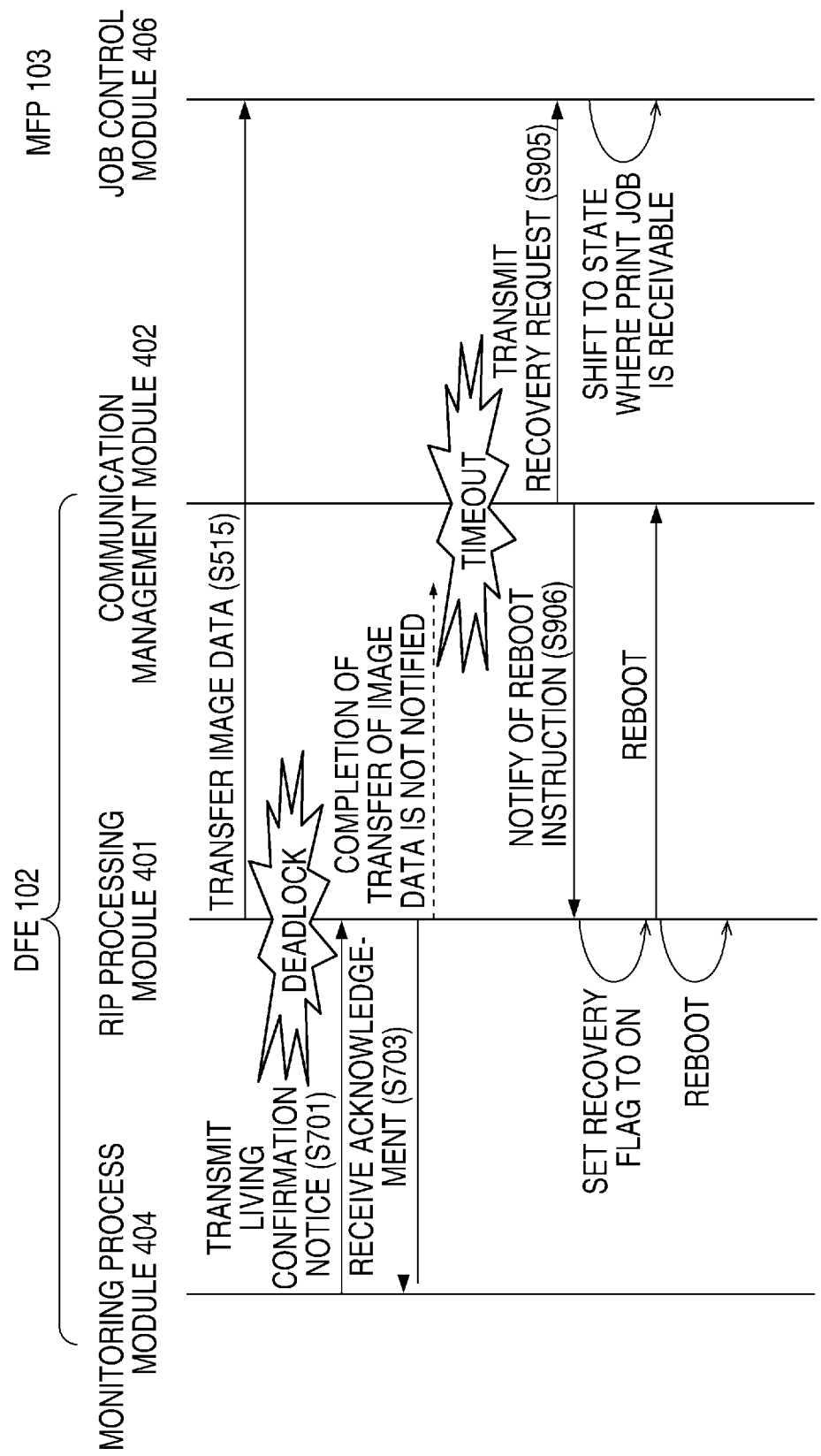

CONTROL APPARATUS DETECTS AN ERROR IN IMAGE PROCESSOR AND REBOOTS THE IMAGE PROCESSOR BEFORE TRANSMITS PRINTING DATA TO PRINTING APPARATUS

BACKGROUND OF THE INVENTION

Field of the Invention

The present invention relates to an information processing apparatus performing a process on the basis of execution data, a control method therefor, a storage medium storing a control program therefor, a process execution apparatus, a control method therefor, and a storage medium storing a control program therefor.

Description of the Related Art

There is a known print system that consists of a DFE (Digital Front End) as an information processing apparatus and an MFP as a process execution apparatus. When the print system executes a print job that consists of a plurality of pages, the DFE generates print data including image data, print setting information, etc., for every page by performing an RIP process in response to a print execution instruction received from a client PC, and the MFP prints according to the print data transmitted from the DFE. When an error occurs during execution of the print process in the print system, for example, when a communication error between the DFE and MFP occurs, the transmitting process of the print data from the DFE to the MFP is interrupted. In such a case, after the communication error between the DFE and MFP is restored, the transmitting process is resumed from the interrupted step. For example, the DFE obtains the number of print data that the MFP received from the MFP concerned, and the MFP transmits the print data that was not received according to the number of print data (for example, see Japanese Laid-Open Patent Publication (Kokai) No. 2011-040043 (JP 2011-040043A)).

However, the technique of the above-mentioned publication requires a user to reboot the DEF by oneself and requires the user to instruct execution of the print process again after the DFE is rebooted when a reboot error of the DFE, such as a hang-up of the DFE, occurs. That is, the conventional print system applies the time and effort more than needed to a user in order to resume the interrupted print process when an error that needs reboot of the DFE occurs.

SUMMARY OF THE INVENTION

The present invention provides an information processing apparatus, a control method therefor, a storage medium storing a control program therefor, a process execution apparatus, a control method therefor, and a storage medium storing a control program therefor, which are capable of resuming an interrupted process without applying the time and effort more than needed to a user.

Accordingly, a first aspect of the present invention provides an information processing apparatus that transmits execution data to a process execution apparatus, the information processing apparatus comprising a data transmission unit configured to transmit the execution data to the process execution apparatus, a detection unit configured to detect an abnormal state of the information processing apparatus, a reboot unit configured to reboot the information processing apparatus, and an obtaining unit configured to obtain an execution condition of the execution data by the process execution apparatus. The reboot unit reboots the information processing apparatus when the detection unit detects the abnormal state of the information processing apparatus. The transmission unit transmits the execution data to the process execution apparatus based on the execution condition obtained by the obtaining unit when the information processing apparatus was rebooted.

Accordingly, a second aspect of the present invention provides a process execution apparatus comprising a process execution unit configured to execute a process based on execution data obtained from an information processing apparatus, and a transmission control unit configured to transmit execution condition of the execution data to the information processing apparatus that was rebooted owing to a detected abnormal state so as to make the information processing apparatus transmit the execution data based on the execution condition.

Accordingly, a third aspect of the present invention provides a control method for an information processing apparatus that transmits execution data to a process execution apparatus, the information processing apparatus comprising a detection step of detecting an abnormal state of the information processing apparatus, a reboot step of rebooting the information processing apparatus when the abnormal state of the information processing apparatus is detected in the detection step, an obtaining step of obtaining an execution condition of the execution data by the process execution apparatus, and a data transmission step of transmitting the execution data to the process execution apparatus based on the execution condition obtained in the obtaining step when the information processing apparatus is rebooted.

Accordingly, a fourth aspect of the present invention provides a control method for a process execution apparatus that executes a process based on execution data obtained from an information processing apparatus, the control method comprising a transmission control step of transmitting execution condition of the execution data to the information processing apparatus that was rebooted owing to a detected abnormal state so as to make the information processing apparatus transmit the execution data based on the execution condition.

Accordingly, a fifth aspect of the present invention provides a non-transitory computer-readable storage medium storing a control program causing a computer to execute the control method of the third aspect.

Accordingly, a sixth aspect of the present invention provides a non-transitory computer-readable storage medium storing a control program causing a computer to execute the control method of the fourth aspect.

According to the present invention, an interrupted process is resumed without applying the time and effort more than needed to a user.

Further features of the present invention will become apparent from the following description of exemplary embodiments with reference to the attached drawings.

BRIEF DESCRIPTION OF THE DRAWINGS

FIG. 8A, FIG. 8B, and FIG. 8C are sequential charts for describing cases where the DFE falls into an uncommunicable state in the print system in FIG. 1. FIG. 8A shows a case where the DFE hangs up during transmission of image data. FIG. 8B shows a case where deadlock of an RIP processing module of the DFE occurs during transmission of image data. FIG. 8C shows a case where the RIP processing module of the DFE hangs up during transmission of image data.

DESCRIPTION OF THE EMBODIMENTS

Hereafter, embodiments according to the present invention will be described in detail with reference to the drawings.

Although the following embodiment describes a case where the present invention is applied to a DFE (Digital Front End) as an information processing apparatus, a subject to which the present invention is applied is not limited to the DFE. For example, the present invention may be applied to a server that is capable of communicating data with a process execution apparatus. Although the embodiment describes a case where the present invention is applied to an MFP as a process execution apparatus, a subject to which the present invention is applied is not limited to the MFP. For example, a process execution apparatus may be an apparatus, such as an SFP (Single Function Printer) and LBP (Laser Beam Printer), which obtains execution data from an information processing apparatus and performs a process on the basis of the obtained execution data. The execution data includes print data that the MFP uses for printing, for example.

Figure 1:
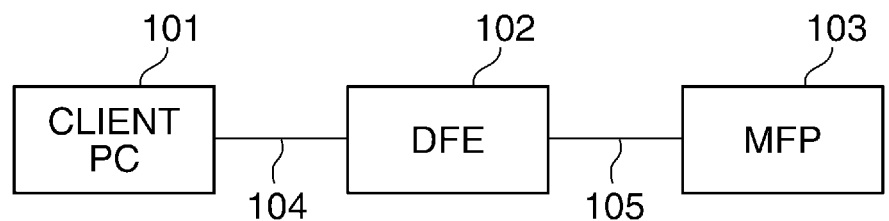
FIG. 1 is a block diagram schematically showing a print system including a DFE as an information processing apparatus according to an embodiment of the present invention.

FIG. 1 is a block diagram schematically showing a print system (an information processing system) 100 including a DFE 102 as an information processing apparatus according to the embodiment of the present invention.

As shown in FIG. 1, the print system 100 is provided with a client PC 101, the DFE 102, and an MFP 103. The client PC 101 and DFE 102 are connected through a network 104. The DFE 102 and MFP 103 are connected through a network 105.

The client PC 101 transmits PDL (Page Description Language) data to the DEL 102 as an execution instruction of a print process. The DFE 102 performs an RIP (Raster Image Processor) process on the basis of the received PDL data, and generates image data, such as raster image data, that is readable by the MFP 103. Moreover, the DFE 102 transmits print data including the image data concerned and print setting information used in a print process to the MFP 103. The MFP 103 prints according to the received print data.

Figure 2:
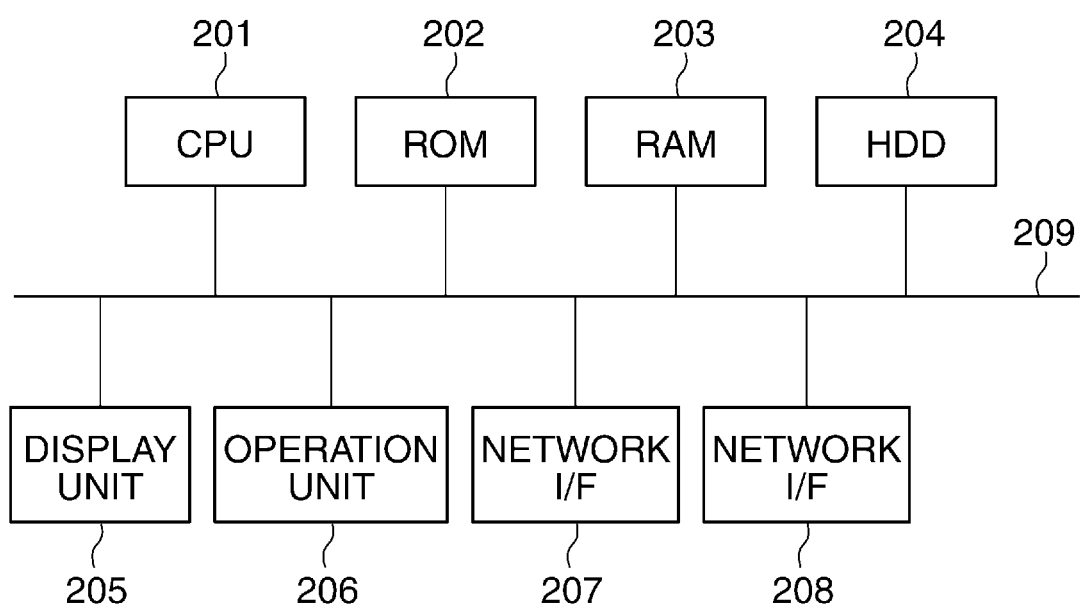
FIG. 2 is a block diagram schematically showing a configuration of the DFE in FIG. 1.

FIG. 2 is a block diagram schematically showing a configuration of the DFE 102 in FIG. 1.

As shown in FIG. 2, the DFE 102 is provided with a CPU 201, a ROM 202, a RAM 203, an HDD 204, a display unit 205, an operation unit 206, and network I/Fs 207 and 208. The CPU 201, ROM 202, RAM 203, HDD 204, display unit 205, operation unit 206, and network I/Fs 207 and 208 are mutually connected through a system bus 209.

The CPU 201 integrally controls the entire DFE 102. The ROM 202 stores various programs that will be executed by the CPU 201. The RAM 203 is used as a working area of the CPU 201 and a temporary data storage area of the CPU 201. The HDD 204 is a nonvolatile storage medium that is able to hold data even if the power is not supplied, and stores programs and data. In the embodiment, the HDD 204 stores a job management table 600 shown in FIG. 6 mentioned later that manages a job for performing a print process (hereinafter referred to as a "print job"). The display unit 205 displays an image. The operation unit 206 includes a keyboard, a mouse, etc. (not shown), and allows a user's operation to set the information about various settings in the DFE 102 through the operation unit 206. The network I/Fs 207 and 208 are used to communicate data with apparatuses that are connected through the networks 104 and 105, respectively. In the embodiment, the network I/F 207 receives the PDL data from the client PC 101 connected to the network 104. Moreover, the network I/F 208 transmits the print data to the MFP 103 connected to the network 105.

Figure 3:
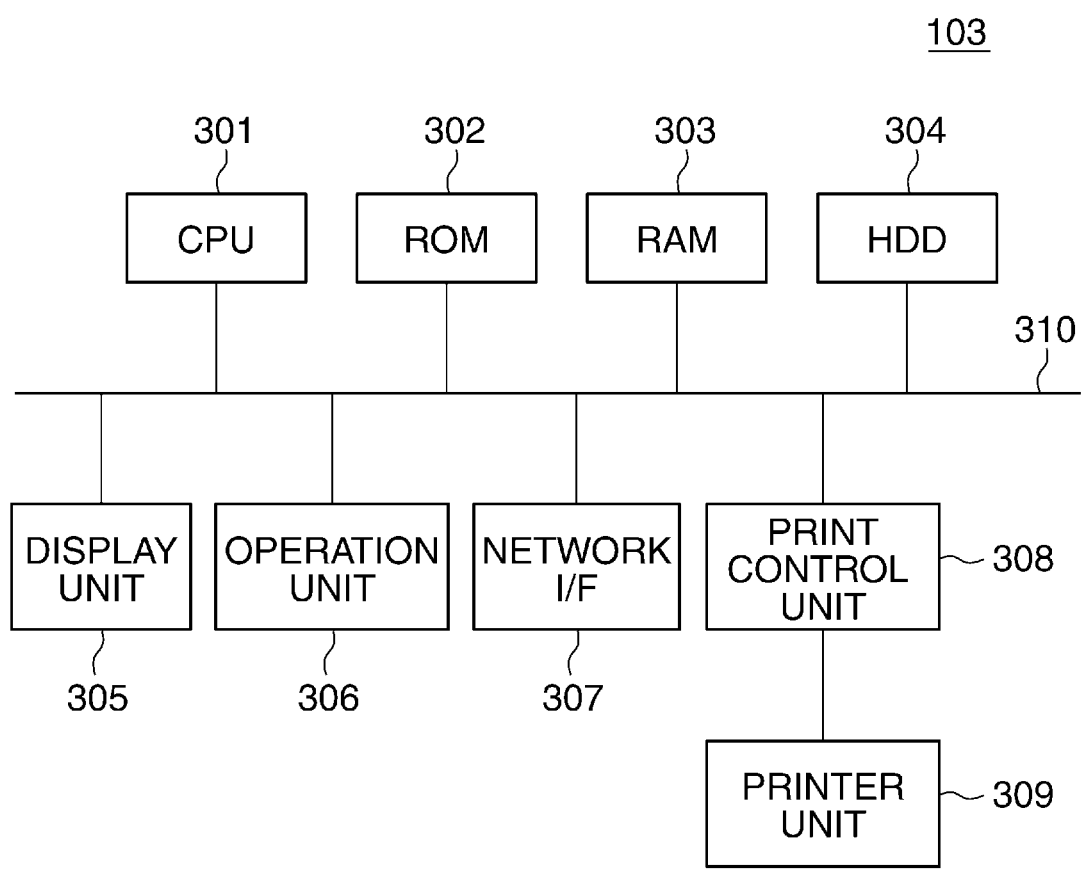
FIG. 3 is a block diagram schematically showing a configuration of an MFP in FIG. 1.

FIG. 3 is a block diagram schematically showing the configuration of the MFP 103 in FIG. 1.

As shown in FIG. 3, the MFP 103 is provided with a CPU 301, a ROM 302, a RAM 303, an HDD 304, a display unit 305, an operation unit 306, a network I/F 307, a print control unit 308, and a printer unit 309. The CPU 301, ROM 302, RAM 303, HDD 304, display unit 305, operation unit 306, network I/F 307, and print control unit 308 are mutually connected through a system bus 310. The printer unit 309 is connected with the print control unit 308.

The CPU 301 integrally controls the entire MFP 103. The ROM 302 stores programs that will be executed by the CPU 301. The RAM 303 is used as a working area of the CPU 301 and a temporary data storage area of the CPU 301. The HDD 304 stores programs and data. The display unit 305 displays a setting screen for setting various items about the MFP 103. The operation unit 306 receives information that is input by a user's operation as the setting information about the MFP 103. The network I/F 307 communicates data with an apparatus that is connected to the network 105, such as the DFE 102. The print control unit 308 instructs the printer unit 309 to start printing on the basis of the received print data. The printer unit 309 prints on the basis of the instruction from the print control unit 308.

Figure 4A:
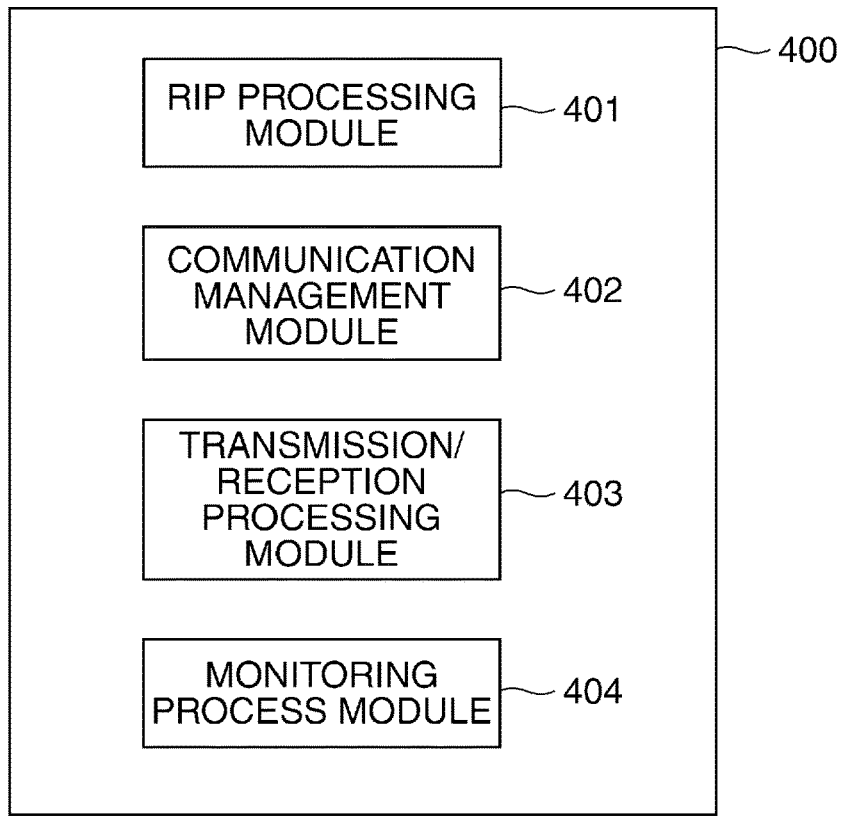
FIG. 4A is a block diagram schematically showing a configuration of software of the DFE in the print system in FIG. 1.
Figure 4B:
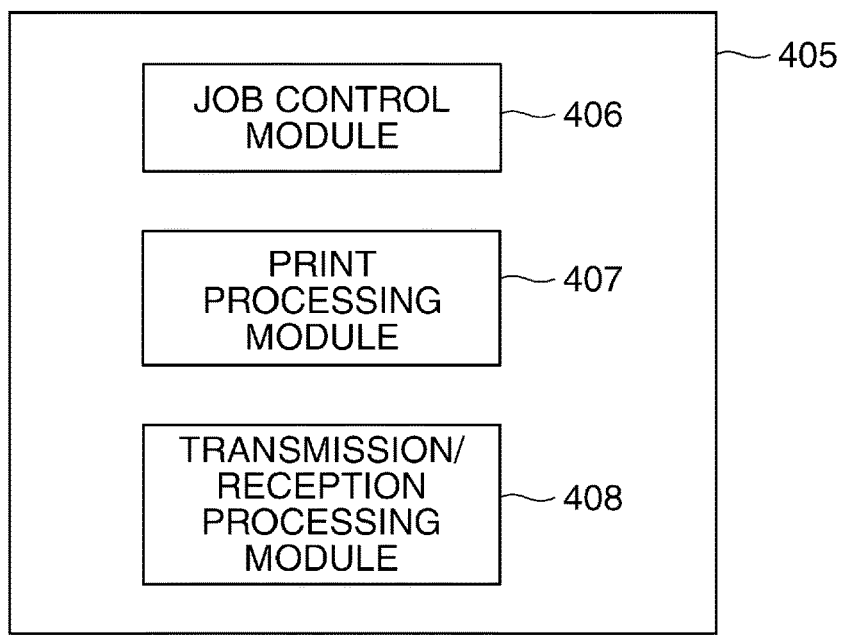
FIG. 4B is a block diagram schematically showing a configuration of software of the MFP in the print system in FIG. 1.

FIG. 4A is a block diagram schematically showing a configuration of software 400 of the DFE 102 in the print system 100 in FIG. 1. FIG. 4B is a block diagram schematically showing a configuration of software 405 of the MFP 103 in the print system 100 in FIG. 1.

As shown in FIG. 4A, the software 400 is provided with an RIP processing module (a print data generation unit) 401, a communication management module 402, a transmission/ reception processing module 403, and a monitoring process module 404. Various processes of the software 400 are performed when the CPU 201 of the DFE 102 runs the various programs stored in the ROM 202.

The RIP processing module 401 stores PDL data obtained from the client PC 101 into the RAM 203, and extracts print setting information from the stored PDL data. Moreover, the RIP processing module 401 generates image data by applying an RIP process to the stored PDL data, and transfers the generated image data to the MFP 103 as print data. The communication management module 402 manages notices about the print process between the DFE 102 and MFP 103, and manages the sequence of the print process of the MFP 103. The transmission/reception processing module 403 manages data communication with the client PC 101 and the MFP 103. The monitoring process module 404 performs a data communication periodically with the RIP processing module 401, and detects an abnormal state of the DFE 102. Specifically, the monitoring process module 404 checks whether the RIP processing module 401 is in an uncommunicable state, such as hang-up and deadlock. When the RIP processing module 401 is in the uncommunicable state, the DFE 102 cannot transfer image data in a print job to the MFP 103, and the print job including the transfer of the image data concerned is interrupted. It is necessary to reboot the DFE 102 in order to resume the interrupted print job.

As shown in FIG. 4B, the software 405 is provided with a job control module (a transmission control unit) 406, a print processing module 407, and a transmission/reception processing module 408. Various processes of the software 405 are performed when the CPU 301 of the MFP 103 runs the various programs stored in the ROM 303.

The job control module 406 stores the print setting information as the print data obtained from the DFE 102 into the RAM 303, and analyzes the print setting information concerned. Accordingly, the MFP 103 prepares to store the image data that the DFE 102 will transmit. Specifically, the job control module 406 allocates a part of the storage area of the RAM 304 to a primary buffer according to the analysis result of the print setting information. Moreover, the job control module 406 stores the image data obtained from the DFE 102 into the primary buffer concerned, and instructs the print processing module 407 to print. The print processing module 407 prints on the basis of the print setting information and image data that have been stored in the RAM 304. The transmission/reception processing module 408 controls the data communication with the DFE 102.

Figure 5:
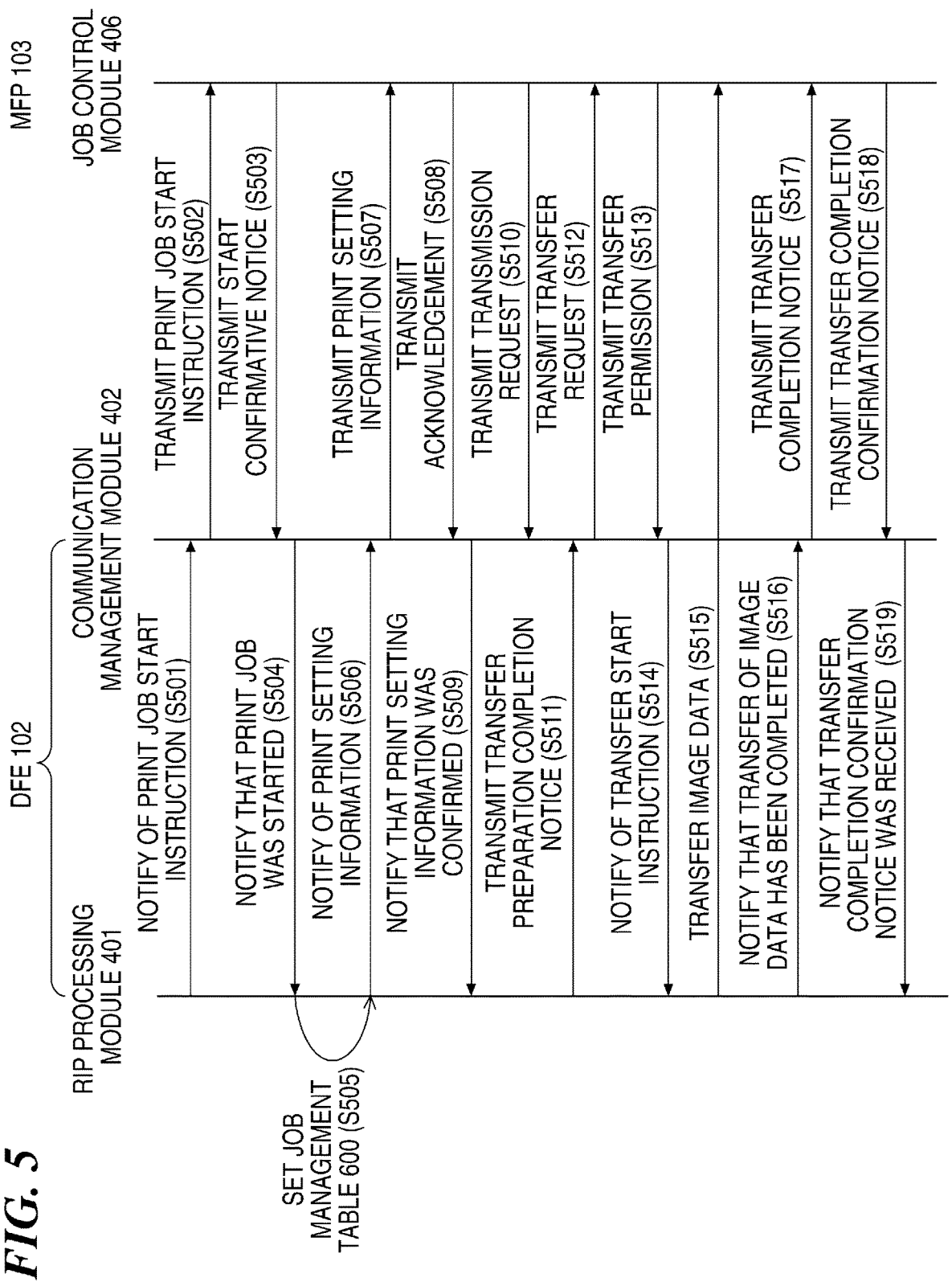
FIG. 5 is a sequential chart showing procedures of a print job execution process executed by the print system in FIG. 1.

FIG. 5 is a sequential chart showing procedures of a print job execution process executed by the print system 100 in FIG. 1.

The process in FIG. 5 is performed when the CPU 201 of the DFE 102 runs the program stored in the ROM 202 and the CPU 302 of the MFP 103 runs the program stored in the ROM 303. The process in FIG. 5 premises that only one page is printed, as an example.

As shown in FIG. 5, the CPU 201 first obtains the print setting information that was extracted by the RIP module 401, and notifies the communication management module 402 of a print job start instruction (step S501). The print setting information includes a name of print data, a size of sheet used for printing, the number of pages, the number of print copies, etc. Next, the CPU 201 transmits a print job start notice to the MFP 103 using the communication management module 402 (step S502). When receiving the print job start notice from the DFE 102, the CPU 301 of the MFP 103 transmits a start confirmative notice showing that the print job start notice was confirmed to the DFE 102 (step S503), and starts the print job.

When receiving the start confirmative notice is received from the MFP 103, the CPU 201 of the DFE 102 notifies the RIP processing module 401 of ID information that specifies the print job and the fact that the MFP 103 started the print job (step S504). Next, the CPU 201 sets the above-mentioned print job to a below-mentioned job management table 600 in FIG. 6 that manages print jobs (step S505). The job management table 600 includes a job ID field 601 and a job name field 602. The ID information that specifies the print job notified in the step S504 is set to the job ID field 601, and the name of the print data included in the print setting information is set to the job name field 602. When the print job has been executed, the information about the print job concerned is deleted from the job management table 600. Moreover, the job management table 600 is stored in the HDD 204 that is a nonvolatile storage medium, and is held even if the DFE 102 reboots. Next, the CPU 201 makes the RIP processing module 401 notify the communication management module 402 of the print setting information (step S506), and makes the communication management module 402 transmit the print setting information to the MFP 103 (step S507).

When receiving the print setting information from the DFE 102, the CPU 301 of the MFP 103 starts preparation for storing the image data on the basis of the received print setting information. When the preparation for storing is completed, the CPU 301 performs a process in step S510 mentioned later. Moreover, the CPU 301 transmits acknowledgement showing that the print setting information was received to the DFE 102 (step S508). When receiving the acknowledgement from the MFP 103, the CPU 201 of the DFE 102 makes the communication management module 402 notify the RIP processing module 401 that the print setting information was confirmed by the MFP 103 (step S509). Accordingly, the RIP processing module 401 performs the RIP process to generate image data, and starts the preparation for transmitting the image data concerned to the MFP 103. When the preparation concerned for transmitting is completed, the CPU 201 makes the RIP processing module 401 perform a process in step S511 mentioned later.

On the other hand, when the above-mentioned preparation for storing is completed, the CPU 301 of the MFP 103 transmits a transmission request that requires transmission of image data to the DEL 102 (step S510). When printing a plurality of pages, the CPU 301 transmits the transmission requests of the image data corresponding to the respective pages to the DFE 102.

When the above-mentioned preparation for transmitting is completed, the CPU 201 of the DFE 102 makes the RIP processing module 401 transmit a transfer preparation completion notice showing that the preparation concerned for transmitting was completed to the communication management module 402 (step S511). Next, when the transmission request from the MFP 103 and the transfer preparation completion notice from the RIP processing module 401 are received by the communication management module 402, the CPU 201 transmits a transfer request, which shows that image data is transmitted, to the MFP 103 (step S512). When receiving the transfer request from the DFE 102, the CPU 301 of the MFP 103 transmits a transfer permission, which shows that transfer of image data is permitted, to the DFE 102 (step S513).

When receiving the transfer permission from the MFP 103, the CPU 201 of the DFE 102 makes the communication management module 402 notify the RIP processing module

401 of a transfer start instruction to start transfer of image data (step S514). Next, the CPU 201 makes the RIP processing module 401 transfer image data to the MFP 103 on the basis of the transfer start instruction (step S515). Next, when completing the transfer of the image data, the CPU 201 makes the RIP module 401 notify the communication management module 402 that the transfer of the image data has been completed (step S516). Next, the CPU 201 transmits a transfer completion notice, which shows that the transfer of image data was completed, to the MFP 103 (step S517). When receiving the transfer completion notice from the DFE 102, the CPU 301 of the MFP 103 transmits a transfer completion confirmation notice, which shows that the transfer completion notice is confirmed, to the DFE 102 (step S518). When receiving the transfer completion confirmation notice from the MFP 103, the CPU 201 of the DFE 102 makes the communication management module 402 notify the RIP processing module 401 that the transfer completion confirmation notice was received (step S519), and finishes the process.

For example, when the RIP processing module 401 falls into an uncommunicable state during the transfer of the image data in the step S515, the image data cannot be transmitted but the print job including the transfer of the image data is interrupted. A conventional print system requires a user to reboot the DFE 102 by oneself and requires the user to instruct resumption of a print job after the DFE 102 reboots in order to resume the interrupted print job. That is, the conventional print system applies the time and effort more than needed to the user in order to resume the interrupted print job when the RIP processing module 401 falls into an uncommunicable state.

In response to this, the monitoring process module 404 and the communication management module 402 detect an abnormal state of the DFE 102 in this embodiment. Specifically, it is checked whether the RIP processing module 401 is in the uncommunicable state. When the RIP processing module 401 is in the uncommunicable state, the RIP processing module 401 and the communication management module 402 are rebooted, and the image data is transmitted to the MFP 103 on the basis of the obtained execution condition of the MFP 103.

Figures 6, 7:
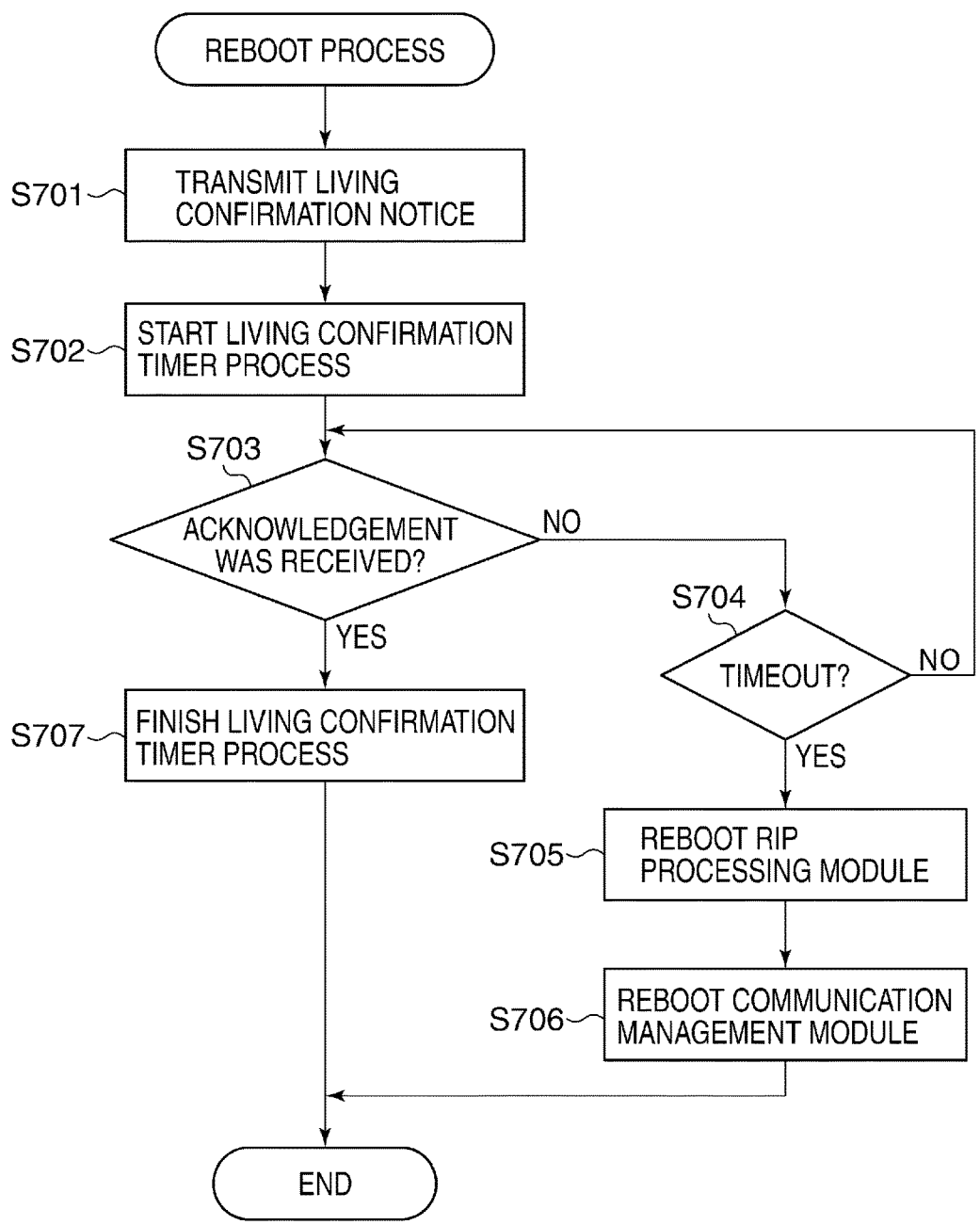
FIG. 6 is a view showing an example of job management information used by the DFE in FIG. 1.
FIG. 7 is a flowchart showing procedures of a reboot process executed by a monitoring process module in FIG. 4A.

FIG. 7 is a flowchart showing procedures of a reboot process executed by the monitoring process module 404 in FIG. 4A.

The process in FIG. 7 is periodically performed by the CPU 201 of the DFE 102 that runs the program stored in the ROM 202 at predetermined intervals during the operation of the DFE 102.

As shown in FIG. 7, the CPU 201 makes the monitoring process module 404 transmit a living confirmation notice, which checks whether RIP processing module 401 is in an uncommunicable state, to the RIP processing module 401 (step S701). Next, the CPU 201 starts a living confirmation timer process that measures elapsed time after transmitting the living confirmation notice by the monitoring process module 404 (step S702). Next, the CPU 201 determines whether the acknowledgement was received from the RIP processing module 401 (step S703). When receiving the living confirmation notice, the RIP processing module 401 will usually transmit the acknowledgement corresponding to the living confirmation notice concerned to the monitoring process module 404. On the other hand, when the RIP processing module 401 is in the uncommunicable state, such as hang-up, the RIP processing module 401 cannot transmit the acknowledgement concerned to the monitoring process module 404.

As a result of the determination in the step S703, when the acknowledgement was not received from the RIP processing module 401, the CPU 201 determines whether predetermined time elapsed after starting the living confirmation timer process, i.e., determines whether the timer timed out (step S704).

As a result of the determination in the step S704, when the timer does not time out, the CPU 201 returns the process to the step S703. On the other hand, as a result of the determination in the step S704, when the timer timed out, the CPU 201 determines that the RIP processing module 401 is in the uncommunicable state. After that, the CPU 201 sets a recovery flag to ON. The recovery flag is used to set up execution of reboot of the RIP processing module 401 and the communication management module 402. When the RIP processing module 401 and the communication management module 402 will be rebooted, the CPU 201 sets the recovery flag to ON. When the RIP processing module 401 and the communication management module 402 will not be rebooted, the CPU 201 sets the recovery flag to OFF. Next, since the recovery flag is ON, the CPU 201 reboots the RIP processing module 401 (step S705), reboots the communication management module 402 (step S706, a reboot execution unit) as shown in the below-mentioned FIG. 8A, and finishes this process.

As a result of the determination in the step S703, when receiving the acknowledgement from the RIP processing module 401, the CPU 201 finishes the living confirmation timer process (step S707), and finishes this process.

Figure 8A:
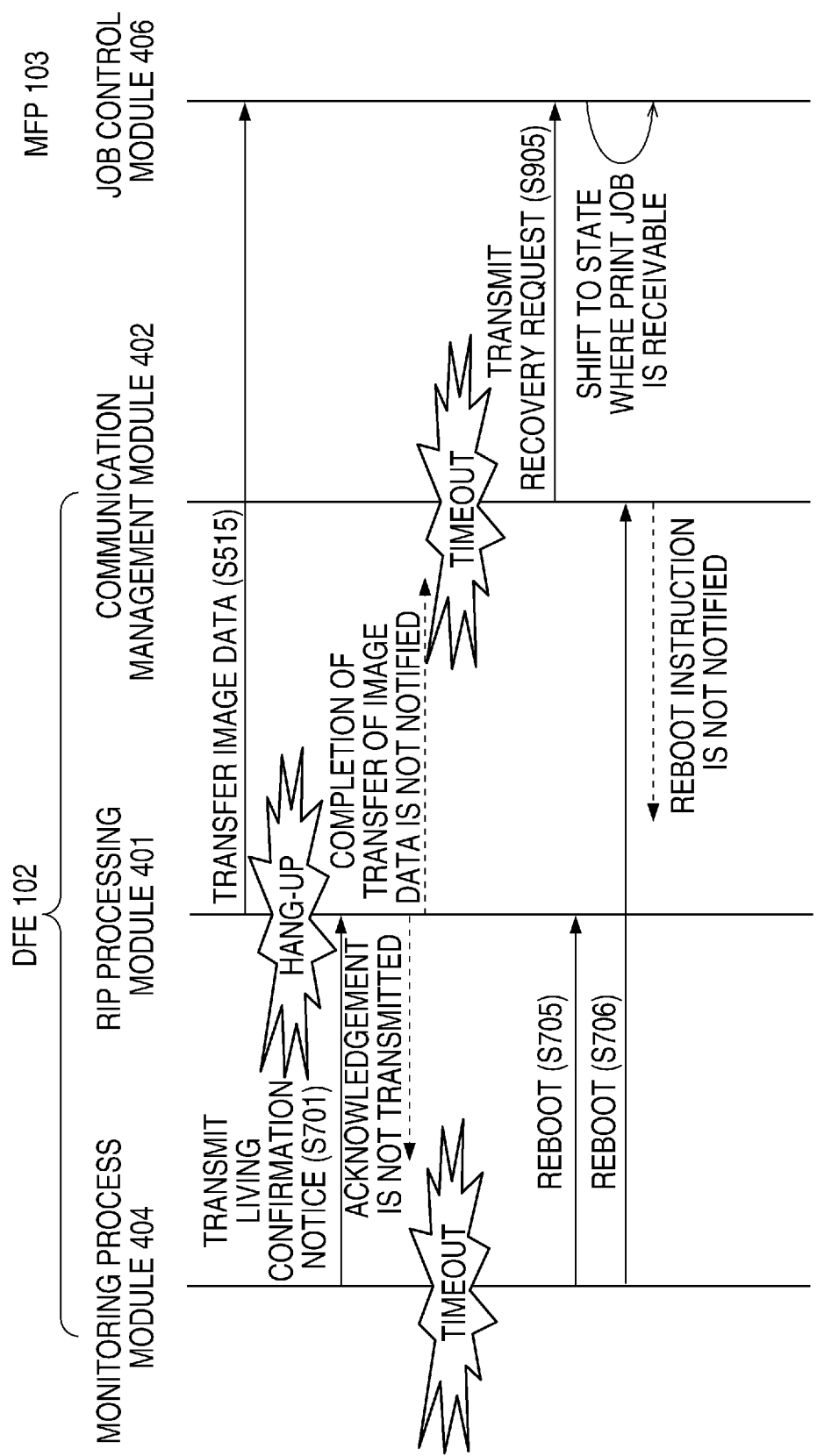
Figure 8C:
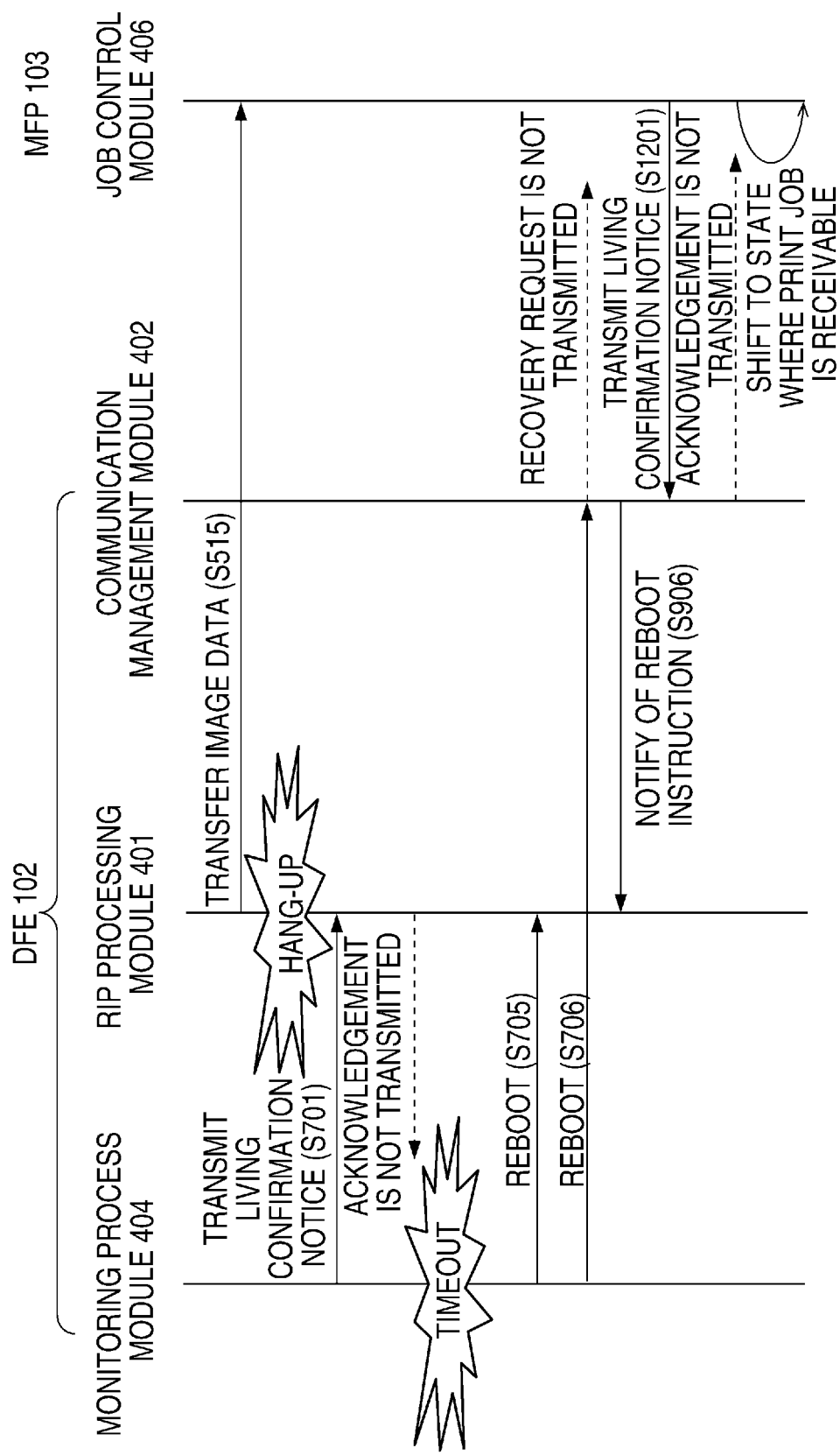

Hereinafter, concrete cases where the DFE 102 in the print system 100 in FIG. 1 falls into the uncommunicable state are shown in FIG. 8A, FIG. 8B, and FIG. 8C. FIG. 8A is a sequential chart showing a case where the RIP processing module 401 of the DFE 102 hangs up during transfer of image data and where the communication management module 402 transmits a recovery request to the MFP 103. FIG. 8B is a sequential chart showing a case where deadlock of the RIP processing module 401 of the DFE 102 occurs during transfer of image data. FIG. 8C is a sequential chart showing a case where the RIP processing module 401 of the DFE 102 hangs up during transfer of image data and where the communication management module 402 cannot transmit the recovery request to the MFP 103.

Figure 9:
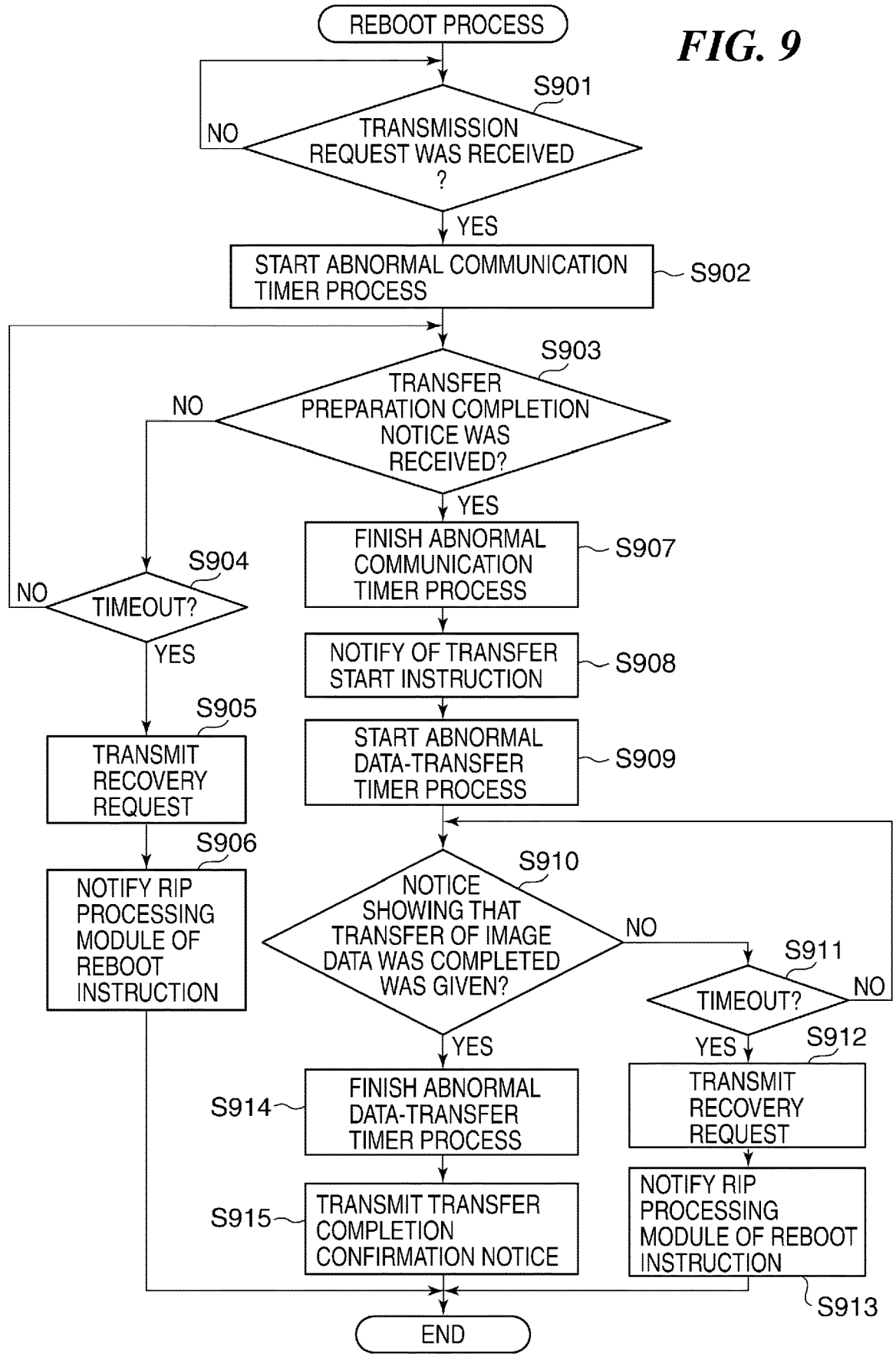
FIG. 9 is a flowchart showing procedures of a reboot process executed by a communication management module in FIG. 4A.

FIG. 9 is a flowchart showing procedures of the reboot process executed by the communication management module 402 in FIG. 4A.

The process in FIG. 9 is performed when the CPU 201 of the DFE 102 runs a program stored in the ROM 202.

As shown in FIG. 9, when receiving the transmission request from the MFP 103 shown in the step S510 in FIG. 5 (YES in step S901), for example, the CPU 201 first starts an abnormal communication timer process that measures elapsed time after receiving the transmission request by the communication management module 402 (step S902). Next, the CPU 201 determines whether the transfer preparation completion notice shown in the step S511 in FIG. 5 was received (step S903).

As a result of the determination in the step S903, when the transfer completion notice was not received, the CPU 201 determines whether predetermined time elapsed after starting the abnormal communication timer process, i.e., determines whether the timer timed out (step S904). In the embodiment, when the transfer of the image data does not complete until the predetermined time elapses after the MFP 103 transmitted the transmission request, the MFP 103 falls into an error state. In this case, the MFP 103 shifts to a state where a new print job is unreceivable (hereinafter referred to as a "print-job unreceivable state") until a reset process, such as reboot of the MFP 103, will be performed, and the MFP 103 cannot perform a new print job.

As a result of the determination in the step S904, when the timer does not time out, the CPU 201 returns the process to the step S903. On the other hand, as a result of the determination in the step S904, when the timer timed out, the CPU 201 determines that the RIP processing module 401 is in the uncommunicable state. After that, the CPU 201 assumes that the MFP 103 shifted to the print-job unreceivable state, and transmits the recovery request for shifting to a print-job receivable state (an executable state) to the MFP 103 (step S905). When the MFP 103 that shifted to the print-job unreceivable state receives the recovery request transmitted from the DFE 102 in the step S905, the MFP 103 performs a print-job cancellation process. After that, when the print-job cancellation process is completed, the MFP 103 shifts to the print-job receivable state.

Contents of the recovery request and a method of the print-job cancellation process are not limited. The recovery request may be a notice that the DFE 102 notifies the MFP 103 that the DFE 102 closes a communication port, for example. This communication port of the DFE 102 is used when the communication management module 402 transmits a print control command to the MFP 103. The MFP 103 may start the print-job cancellation process on the basis of reception of the notice of closing the communication port. That is, the recovery request may play both a role of the notice of closing the communication port and a role of the above-mentioned recovery request. When receiving the notice showing that the communication port closed, the MFP 103 starts a process for shifting to the print-job receivable state. Moreover, the recovery request may be a notice that instructs the MFP 103 to delete a print job. The communication management module 402 may transmit both a first notice notifying the MFP 103 to close the communication port and a second notice instructing the MFP 103 to delete the print job to the MFP 103.

Next, the CPU 201 makes the communication management module 402 notify the RIP processing module 401 of the reboot instruction as shown in FIG. 8B (step S906). After that, the CPU 201 makes the RIP processing module 401 set the recovery flag to ON as shown in FIG. 8B, and makes the RIP processing module 401 notify the communication management module 402 of the reboot instruction. After that, the CPU 201 reboots the RIP processing module 401 and the communication management module 402, and finishes this process. When the recovery flag has already set to ON before performing the process in the step S906, and when the RIP processing module 401 and the communication management module 402 have been rebooted by the process in FIG. 7, there is high possibility that the reboot error of the DFE was solved. In this case, the CPU 201 may not notify the RIP processing module 401 of the reboot instruction in order to reduce execution of unnecessary reboot.

As a result of the determination in the step S903, when the transfer preparation completion notice is received, the CPU 201 transmits the transfer request to the MFP 103 (for example, the step S512 in FIG. 5). After that, when receiving the transfer permission from the MFP 103 (for example, the step S513 in FIG. 5), the CPU 201 finishes the abnormal communication timer process (step S907). Next, the CPU 201 makes the communication management module 402 notify the RIP processing module 401 of the transfer start instruction (step S908, for example, the step S514 in FIG. 5). Next, the CPU 201 makes the monitoring process module 402 start an abnormal data-transfer timer process that measures elapsed time after notifying of the transfer start instruction (step S909). Next, the CPU 201 determines whether the notice showing that the transfer of the image data was completed was given from the RIP processing module 401 like the step S516 in FIG. 5, for example (step S910).

As a result of the determination in the step S910, when the notice showing that the transfer of the image data was completed was not given, the CPU 201 determines whether predetermined time elapsed after starting the abnormal data-transfer timer process, i.e., determines whether the timer timed out (step S911).

As a result of the determination in the step S911, when the timer does not time out, the CPU 201 returns the process to the step S910. On the other hand, as a result of the determination in the step S911, when the timer timed out, the CPU 201 determines that the RIP processing module 401 is in the uncommunicable state. Then, the CPU 201 transmits the recovery request to the MFP 103 (step S912). Accordingly, when the MFP 103 was in the print-job unreceivable state, the MFP 103 shifts to the print-job receivable state. Next, the CPU 201 notifies the RIP processing module 401 of the reboot instruction (step S913). After that, the CPU 201 makes the RIP processing module 401 set the recovery flag to ON, and makes the RIP processing module 401 notify the communication management module 402 of the reboot instruction. After that, the CPU 201 reboots the RIP processing module 401 and the communication management module 402, and finishes this process. When the recovery flag has already set to ON before performing the process in the step S913, and when the RIP processing module 401 and the communication management module 402 have been rebooted by the process in FIG. 7, there is high possibility that the reboot error of the DFE was solved. In this case, the CPU 201 may not notify the RIP processing module 401 of the reboot instruction in order to reduce execution of unnecessary reboot.

As a result of the determination in the step S910, when the notice showing that the transfer of the image data was completed was given, the CPU 201 finishes an abnormal data-transfer timer process (step S914) and transmits the transfer completion notice to the MFP 103 like the step S517 in FIG. 5, for example. After that, when the transfer completion confirmation notice is received from the MFP 103 like the step S518 in FIG. 5, for example, the CPU 201 notifies the RIP processing module 401 that the transfer completion confirmation notice was received (step S915, for example the step S519 in FIG. 5). The CPU 201 finishes this process after the process in the step S915. That is, the abnormal state of the DFE 102 is detected through the process in FIG. 7 by the monitoring process module 404 and the process in FIG. 9 by the communication management module 402 in the embodiment.

Figure 10:
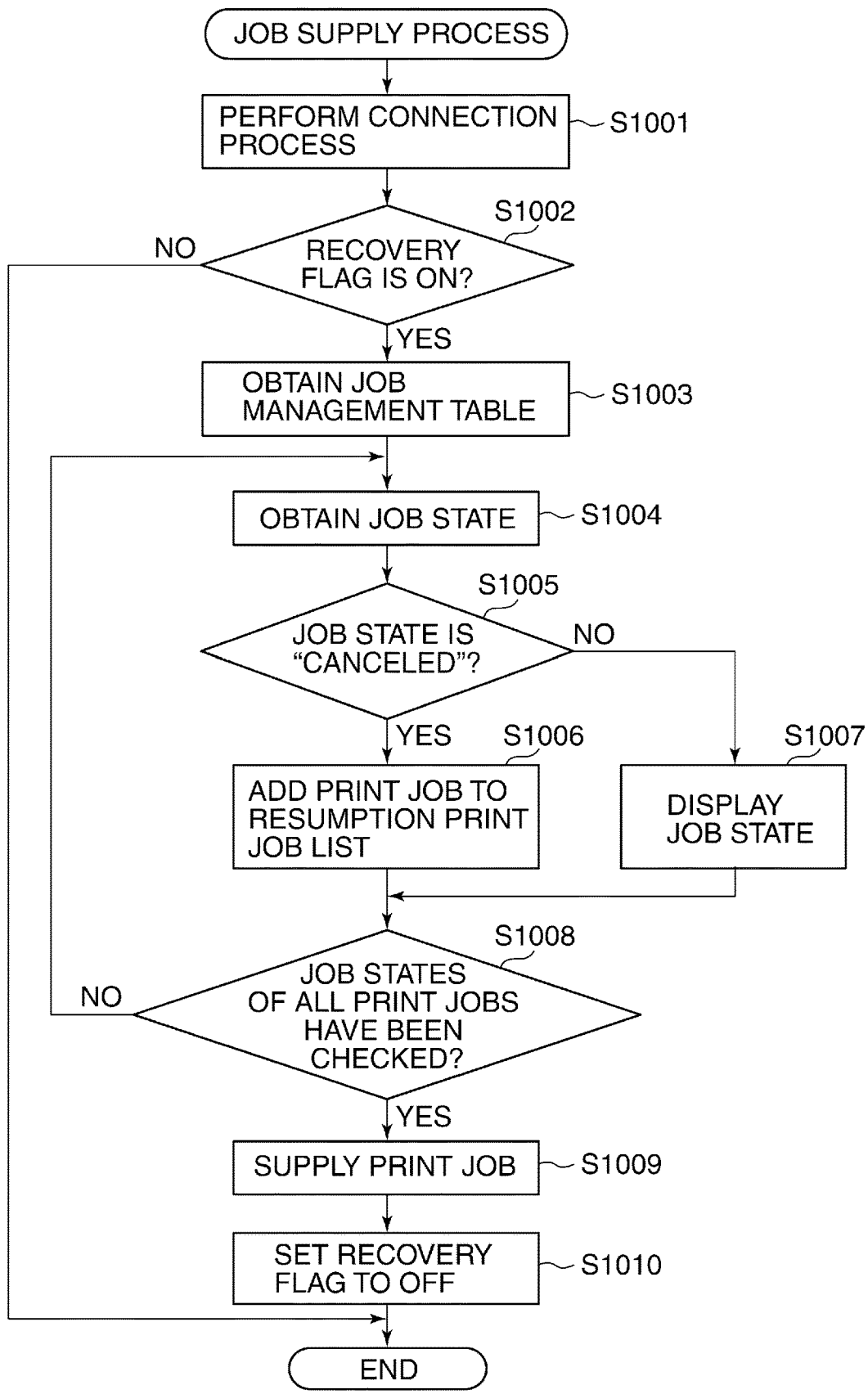
FIG. 10 is a flowchart showing procedures of a job supply process executed by the DFE in FIG. 1.

FIG. 10 is a flowchart showing procedures of a job supply process executed by the DFE 102 in FIG. 1.

The process in FIG. 10 is performed when the CPU 201 of the DFE 102 runs a program stored in the ROM 202. Moreover, the process in FIG. 10 is performed after rebooting the RIP processing module 401 and the communication management module 402 in the processes in FIG. 7 and FIG. 9 (hereinafter referred to as a "reboot in the DFE 102").

Incidentally, although the DFE 102 determines whether the execution of the print job was completed using the job management table 600, the job management table 600 does not include an execution condition that shows which process is running for each print job. Accordingly, the job management table 600 is insufficient to instruct suitable resumption of a print job by the DFE 102 after the reboot in the DFE 102. For example, the DFE 102 may erroneously instruct about the print job in which the transfer of the image data from the DFE 102 to the MFP 103 was completed to transfer the image data concerned again after the reboot in the DFE 102.

In response to this, the DFE 102 obtains the execution condition of the print job in the MFP 103 and resumes the print job on the basis of the obtained execution condition in the embodiment.

As shown in FIG. 10, the CPU 201 first performs a connection process to connect with the MFP 103 in order to set up the data communication with the MFP 103 that was reset by reboot (step S1001). The connection process includes a communication setting for transmitting image data, etc. Next, the CPU 201 determines whether the recovery flag is set to ON (step S1002).

As a result of the determination in the step S1002, when the recovery flag is set to OFF, the CPU 201 finishes this process finishes. On the other hand, as a result of the determination in the step S1002, when the recovery flag is set to ON, the CPU 201 obtains the job management table 600 from the HDD 204 (step S1003). Next, the CPU 201 obtains the execution condition of each print job in the MFP 103 from the MFP 103 concerned on the basis of the job ID set in the job management table 600. Specifically, the CPU 201 obtains a job state as the execution condition of the print job from the MFP 103 (step S1004). The job state includes a "completion of normal output", "canceled", "printing", "print process waiting", and "print interrupting". The "completion of normal output" shows that execution of a print job is completed. The "canceled" shows that the transfer of the image data included in the print job was stopped owing to the reboot in the DFE 102 by the process in FIG. 7 or the process in FIG. 9. The "printing" shows that a print job is performing. The "print process waiting" shows that a print job is waiting for execution. The "print interrupting" shows that execution of a print job is being interrupted. Interruption factors include paper empty, paper jam, and full-load of an ejection destination. Next, the CPU 201 determines whether the job state obtained is "canceled" (step S1005).

As a result of the determination in the step S1005, when the job state obtained is "canceled", the CPU 201 decides to resume the transfer of the image data because the print job in the job state concerned has not completed the transfer of the image data from the DEE, 102 to the MFP 103. That is, the CPU 201 decides to resume the print job including the transfer of the image data concerned, and adds the above-mentioned print job to a resumption print job list (not shown) that manages a print job that is instructed to resume (step S1006). Next, the CPU 201 determines whether job states of all the print jobs in the job management table 600 have been checked (step S1008).

As a result of the determination in the step S1005, when the job state obtained is not "canceled", i.e., the job state is "completion of normal output", "printing", "print process waiting", or "print interrupting", the print job in the job state concerned has completed the transfer of the image data from the DFE 102 to the MFP 103 at least. Since the process of the DFE 102 in the print job concerned has been completed, the CPU 201 does not add the above-mentioned print job to the resumption print job list. After that, the CPU 201 displays the job state of each print job on the display unit 205 (step S1007), and determines in the step S1008.

As a result of the determination in the step S1008, when the job state of any print job in the job management table 600 was not checked, the CPU 201 returns the process to the step S1004. On the other hand, as a result of the determination in the step S1008, when the job states of all the print jobs in the job management table 600 have been checked, the CPU 201 supplies each print job added to the resumption print job list (step S1009). Accordingly, the process in FIG. 5 is performed in each supplied print job, and the print job interrupted owing to the reboot in the DFE 102 is resumed. Next, the CPU 201 sets the recovery flag to OFF (step S1010), and finishes this process.

Figure 11A:
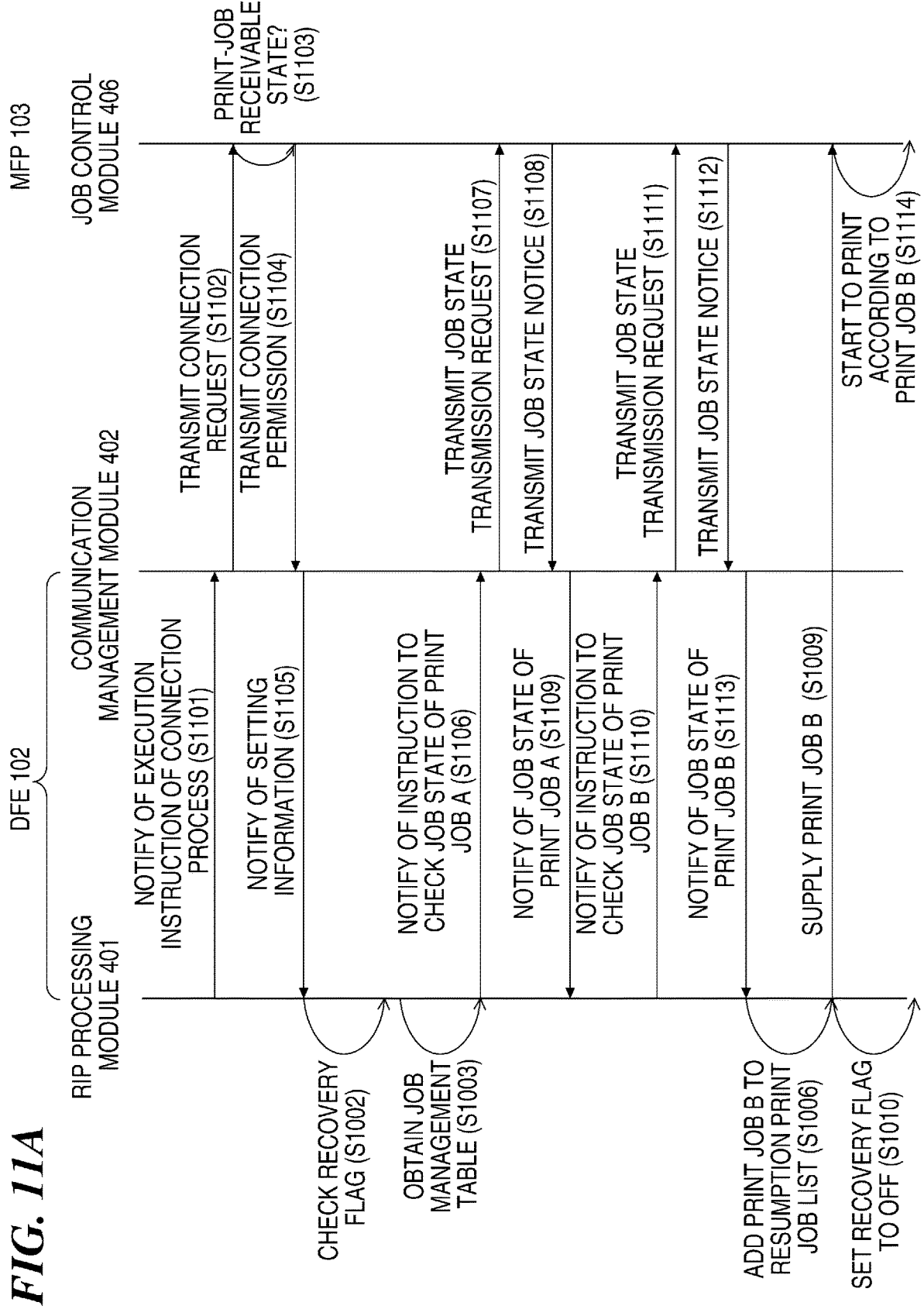
FIG. 11A and FIG. 11B are sequential charts showing procedures of a print resumption process executed by the print system in FIG. 1.
Figure 11B:
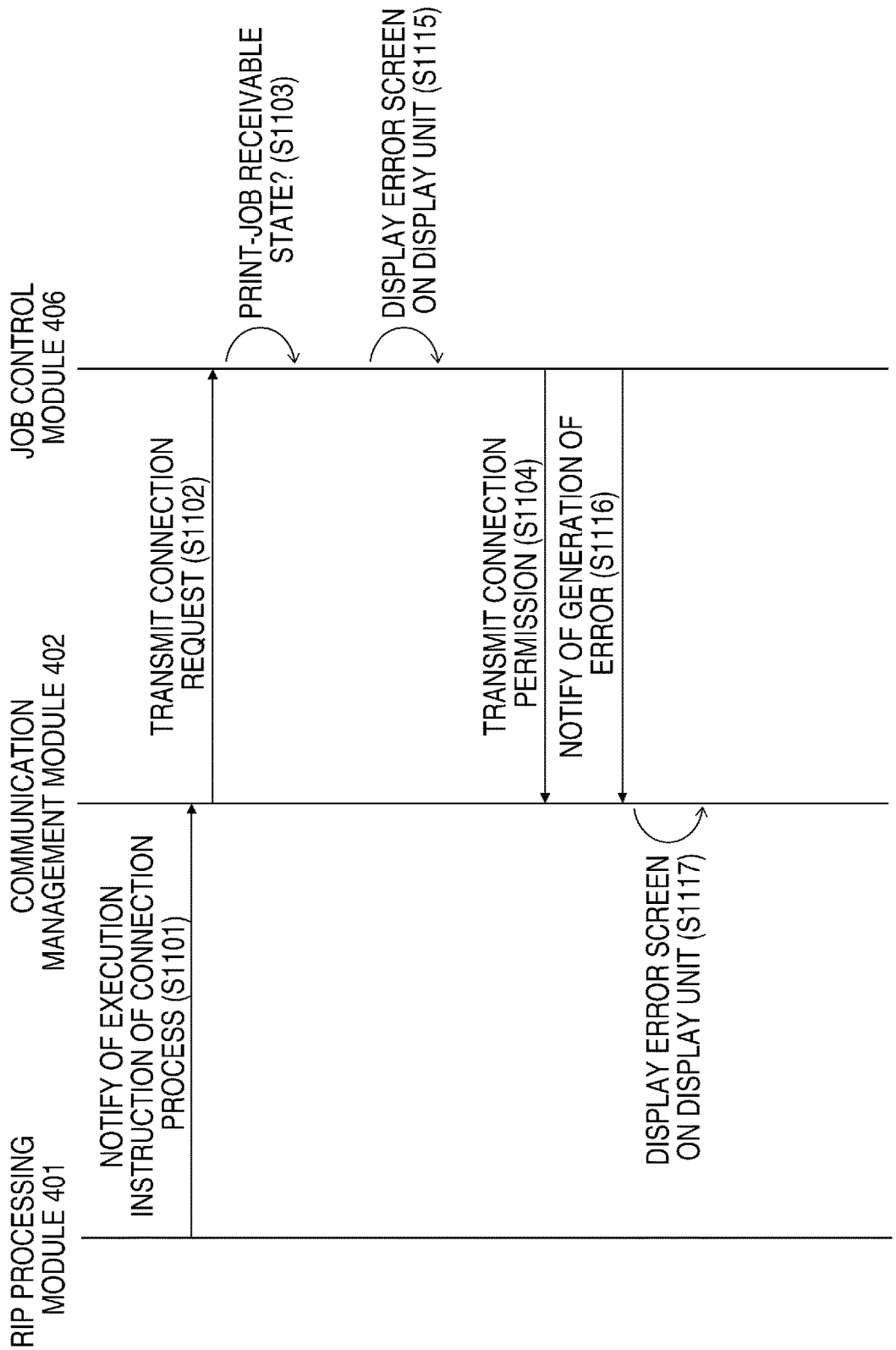

FIG. 11A and FIG. 11B are sequential charts showing procedures of a print resumption process executed by the print system 100 in FIG. 1.

The process in FIG. 11A and FIG. 11B is performed when the CPU 201 of the DEL 102 runs the program stored in the ROM 202 and the CPU 302 of the MFP 103 runs the program stored in the ROM 303. The process in FIG. 11A and FIG. 11B is described on the assumption that the DFE 102 reboots at a timing at which a job state of a print job A is "completion of normal output" and a job state of a print job B is "printing" as an example.

As shown in FIG. 11A, the CPU 201 first performs a process in step S1001 in FIG. 10. Specifically, the CPU 201 makes the RIP processing module 401 notify the communication management module 402 of the execution instruction of the connection process (step S1101). Next, the CPU 201 transmits the connection request that requests execution of the connection process to the MFP 103 using the communication management module 402 (step S1102). When receiving the connection request from the DFE 102, the CPU 301 of the MFP103 determines whether the MFP103 is in the print-job receivable state (step S1103). In the step S1103, when the print-job cancellation process has been completed, the CPU 301 determines that the MFP103 is in the print-job receivable state. On the other hand, when the print-job cancellation process has not been completed, the CPU 301 determines that the MFP103 is in the print-job unreceivable state. For example, the CPU 301 determines whether the print-job cancellation process has been completed on the basis of whether a queue of the print job is empty. When the queue of the print job is empty at the timing of receiving the connection request, the CPU 301 determines that the cancellation process has been completed. On the other hand, when the print data remains in the queue of the print job, the CPU 301 determines that the cancellation process has not been completed.

As a result of the determination in the step S1103, when the MFP103 is in the print-job unreceivable state, the CPU 301 performs a process in step S1115 and following steps in FIG. 11B mentions later. On the other hand, as a result of the determination in the step S1103, when the MFP103 is in the print-job receivable state, the CPU 301 transmits a connection permission including the setting information etc. that are used in the connection process to the DFE 102 (step S1104). When receiving the connection permission from the MFP 103, the CPU 201 of the DFE 102 makes the communication management module 402 notify the RIP processing module 401 of the setting information etc. that are used in the connection process (step S1105). This performs data communication setting between the DFE 102 and MFP 103.

Next, the CPU 201 determines whether the set-up recovery flag is ON (for example, the step S1002 in FIG. 10). When the recovery flag is ON, the job management table 600 is obtained from the HDD 204 (for example, the step S1003 in FIG. 10). Next, the CPU 201 makes the RIP processing module 401 notify the communication management module 402 of an instruction to check the job state of the print job A in step S1106 (for example, the step S1004 in FIG. 10). Next, the CPU 201 makes the communication management module 402 transmit a job state transmission request that requests to transmit the job state of the print job A to the MFP 103 (step S1107). When receiving the job state transmission request about the print job A from the DFE 102, the CPU 301 of the MFP103 transmits the job state notice including the job state of the print job A to the DFE 102 (step S1108). When receiving the job state notice from the MFP 103, the CPU 201 of the DFE 102 makes the communication management module 402 notify the RIP processing module 401 of the job state of the print job A (step S1109). Accordingly, the RIP processing module 401 obtains the job state of the print job A. Since the job state of the print job A is "printing", the transfer of the image data included in the print job A concerned has been completed. Accordingly, the CPU 201 displays the execution condition of the print job A on the display unit 205 of the DFE 102 without adding the print job A to the resumption print job list (for example, the step S1007 in FIG. 10). Next, the CPU 201 determines whether job states of all the print jobs in the job management table 600 have been checked (for example, the step S1008 in FIG. 10). For example, when the job state of the print job B among the print jobs listed in the job management table 600 has not been checked, the CPU 201 performs the process in the step S1004 in FIG. 10 for the print job B. Specifically, the CPU 201 makes the RIP processing module 401 notify the communication management module 402 of the instruction to check the job state of the print job B (step S1110). Next, the CPU 201 transmits the job state transmission request to the MFP 103 using the communication management module 402 (step S1111). When receiving the job state transmission request about the print job B from the DFE 102, the CPU 301 of the MFP103 transmits the job state notice including the job state of the print job B to the DFE 102 (step S1112). When receiving the job state notice from the MFP 103, the CPU 201 of the DFE 102 makes the communication management module 402 notify the RIP processing module 401 of the job state of the print job B (step S1113). Accordingly, the RIP processing module 401 obtains the job state of the print job B. When the job state of the print job B is "canceled", the transfer of the image data of the print job B is not completed. In that case, the CPU 201 adds the print job B to the resumption print job list (for example, the step S1006 in FIG. 10). Next, when checking the job states of all the print jobs in the job management table 600 (YES in the step S1008 in FIG. 10), the CPU 201 performs the process in the steps S1009 and S1010 in FIG. 10. Accordingly, the CPU 201 transmits the image data of the print job B to the MFP 103 by the RIP processing module 401. That is, only the print job of which execution was stopped owing to the reboot in the DFE 102 is resumed in the embodiment. When the transfer of the image data concerned is completed, the CPU 301 of the MFP 103 starts to print according to the print job B (step S1114), and finishes this process.

As a result of the determination in the step S1103, when the MFP 103 is in the print-job unreceivable state, the CPU 301 of the MFP 103 displays an error screen on the display unit 305 (step S1115 in FIG. 11B). By checking the error screen, a user is able to take a corresponding action. For example, the user may manually cancel a job that has not been canceled. Moreover, the user may manually turn OFF and turn ON the power of the MFP 103 in order to cancel an error.

Next, the CPU 301 transmits the connection permission (step S1104), and notifies the DFE 102 of generation of error (S1116). When the DEF 102 is notified of the generation of the error from the MFP 103, the CPU 201 does not perform the process in the step S1105 and the following steps, and displays the error screen showing that the error occurred in the MFP 103 on the display unit 205 (step S1117). Accordingly, the DFE 102 is prevented from re-applying a print job to the MFP 103 unnecessarily when the MFP 103 is in the print-job unreceivable state. Then, the CPU 201 finishes this process.

According to the embodiment mentioned above, when the abnormal state of the DFE 102 is detected, the RIP processing module 401 and communication management module 402 are rebooted, and the print job is resumed on the basis of the obtained execution condition of the MFP 103. Accordingly, even if the image data cannot be transferred due to the abnormal state of the DFE 102 and the print job including the transfer of the image data is interrupted, the MFP 103 resumes execution of the print job without a user's operation to reboot the DFE 102 and a user's instruction to resume the print job. That is, the interrupted print job is resumed, without applying time and effort to a user.

Moreover, only the print job of which execution was stopped owing to the abnormal state of the DFE 102 is executed in the embodiment mentioned above. This prevents erroneous re-execution of the print job that has been executed. As a result, the execution time of the entire process is shortened.

Furthermore, in the above-mentioned embodiment, the MFP 103 shifts to the print-job unreceivable state when image data is not received in a predetermined period. The recovery request for shifting the MFP 103 to the print-job receivable state is transmitted to the MFP 103 in response to the reboot of the DFE 102. Accordingly, even if the MFP 103 cannot receive the image data in the predetermined period owing to the abnormal state of the DFE 102 and shifts to the print-job unreceivable state, the MFP 103 is shifted to the print-job receivable state by interlocking with the reboot of the DFE 102. As a result, the print job is executed without delay.

Since the job state is transmitted to the DFE 102 from the MFP 103, the DFE 102 certainly specifies the print job of which execution was stopped owing to the abnormal state of the DFE 102 in the above-mentioned embodiment.

Although the present invention was described above using the embodiment, the present invention is not limited to the embodiment mentioned above.

For example, the MFP103 may determine whether the DFE 102 is in the uncommunicable state, and the MFP 103 may be shifted to the print-job receivable state on the basis of the determined result.

Figure 12:
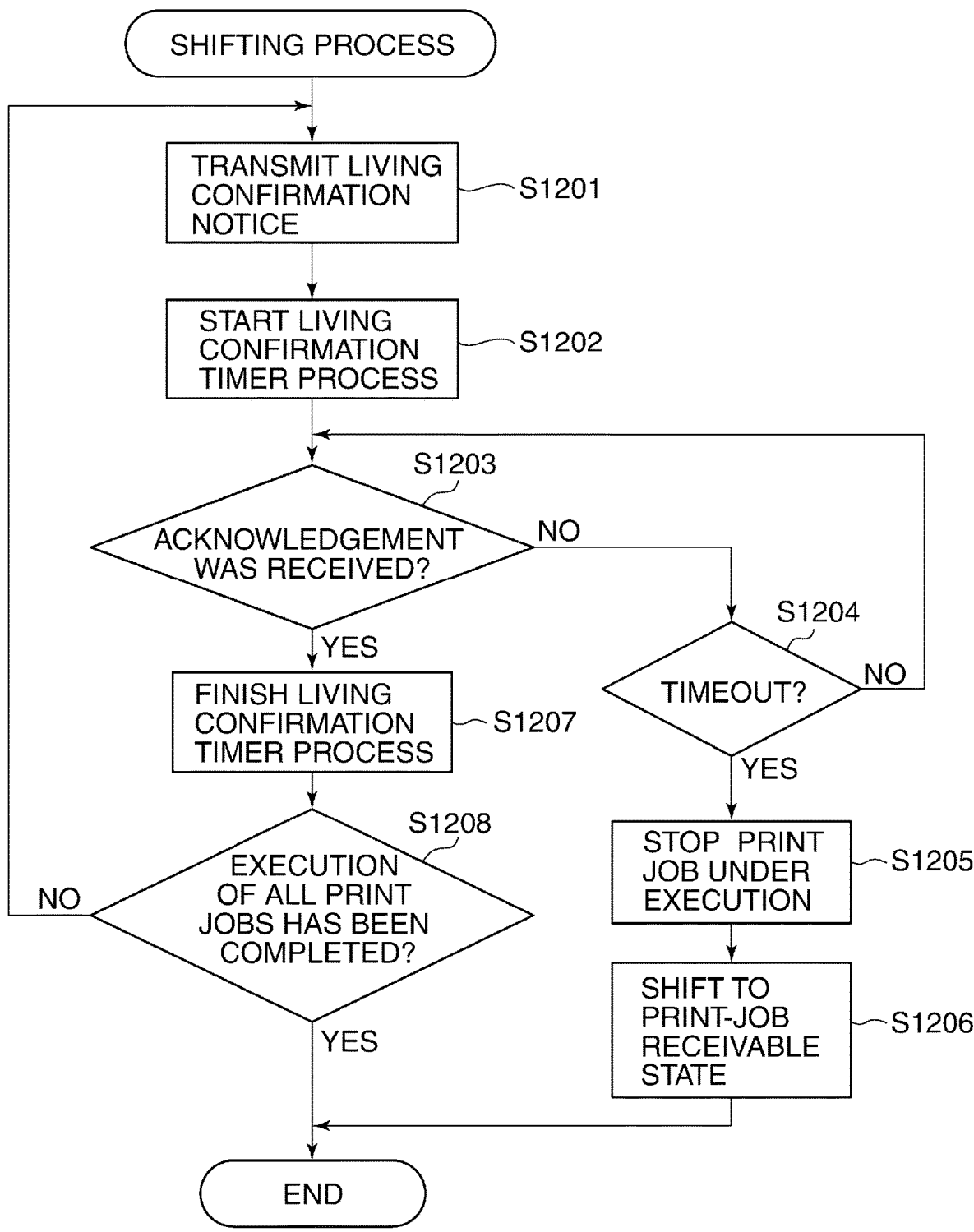
FIG. 12 is a flowchart showing procedures of a shifting process executed by the MFP in FIG. 1.

FIG. 12 is a flowchart showing procedures of a shifting process executed by the MFP 103 in FIG. 1.

The process in FIG. 12 is periodically performed by the CPU 301 of the MFP 103 that runs the program stored in the ROM 303 at predetermined intervals during the operation of the MFP 103.

As shown in FIG. 12, the CPU 301 first transmit the living confirmation notice that determines whether the DFE 102 is in the uncommunicable state to the DFE 102 (step S1201, for example, see FIG. 8C). When receiving the living confirmation notice, the DFE 102 usually transmits the acknowledgement in response to the living confirmation notice concerned to the MFP 103. However, if the DEE, 102 is in the uncommunicable state because of rebooting etc., the DFE 102 cannot transmit the acknowledgement concerned to the MFP 103. Next, the CPU 301 starts the living confirmation timer process that measures elapsed time after transmitting the living confirmation notice (step S1202). Next, the CPU 301 determines whether the acknowledgement was received from the DFE 102 (step S1203).

As a result of the determination in the step S1203, when the acknowledgement was not received, the CPU 301 determines whether predetermined time elapsed after starting the living confirmation timer process, i.e., determines whether the timer timed out (step S1204).

As a result of the determination in the step S1204, when the timer does not time out, the CPU 301 returns the process to the step S1203. On the other hand, as a result of the determination in the step S1204, when the timer timed out, the CPU 301 stops the print job under execution (step S1205). Next, when the MFP103 is in the print-job unreceivable state, the CPU 301 makes the MFP 103 concerned shift to the print-job receivable state (step S1206), and finishes this process.

As a result of the determination in the step S1203, when the acknowledgement is received, the CPU 301 finishes the living confirmation timer process (step S1207), and determines whether the execution of all the supplied print jobs has been completed (step S1208).

As a result of the determination in the step S1208, when the execution of any print job among the supplied print jobs has not been completed, the CPU 301 returns the process to the step S1201. On the other hand, as a result of the determination in the step S1208, when the execution of all the supplied print jobs has been completed, the CPU 301 finishes this process.

In the above-mentioned process in FIG. 12, the MFP 103 is shifted to the print-job receivable state on the basis of the acknowledgement transmitted from the MFP 103 in response to the living confirmation notice. Accordingly, even if the DFE 102 does not transmit the recovery request to the MFP 103, the MFP 103 is able to be shifted to the print-job receivable state, which enables to print according to the print job without delay.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2016-007831, filed Jan. 19, 2016 and No. 2016-118926, filed Jun. 15, 2016 which are hereby incorporated by reference herein in their entireties.

What is claimed is:

1. A control apparatus comprising:
a receiver that receives print data from an information processing apparatus;
an image processor that performs raster image processing on the print data received by the receiver;
a transmitter that transmits a print job for performing printing based on image data generated by the raster image processing to a printing apparatus; and
a controller that performs a rebooting process of the image processor based on detecting an error of the image processor,
wherein, after the rebooting process is performed, the controller specifies the print job whose transmission has been started before the rebooting process is performed but not completed, and the transmitter starts retransmission of at least the print job specified by the controller to the printing apparatus without receiving a retransmission instruction of the image data from a user.

2. The control apparatus according to claim 1, further comprising a detector that detects the error of the image processor.

3. The control apparatus according to claim 2,
wherein the detector performs notification to the image processor, and
wherein the detector detects the error based on lack of a response to the predetermined notification.

4. The control apparatus according to claim 1, wherein the print data is PDL (Page Description Language) data.

5. The control apparatus according to claim 1,
wherein the receiver is a first interface and the transmitter is a second network which is different from the first interface.

6. The control apparatus according to claim 1,
wherein the error of the image processor is a hang-up of the image processor.

7. The control apparatus according to claim 1,
wherein the transmitter transmits a command for shifting the printing apparatus from an error state to a state where the error state is resolved after completion of the rebooting process, and
wherein the transmitter starts retransmission of at least the print job specified by the controller to the printing apparatus after the transmitter transmits the command.

8. The control apparatus according to claim 1,
wherein the print job of which transmission has been started but not completed is the print job of which transmission is interrupted.

9. An image data transmission method comprising:
receiving print data from an information processing apparatus;
performing, by an image processor, raster image processing on the received print data;

transmitting, by a transmitter, a print job for performing printing based on image data generated by the raster image processing to a printing apparatus;

performing a rebooting process of the image processor based on detecting an error of the image processor; and after the rebooting process is performed, specifying the print job whose transmission has been started before the rebooting process is performed but not completed and starting retransmission of at least the specified print job to the printing apparatus without receiving a retransmission instruction of the image data from a user.

10. A non-transitory computer-readable storage medium storing a control program causing a computer to execute an image data transmission method comprising:

receiving print data from an information processing apparatus;

performing, by an image processor, raster image processing on the received print data;

transmitting, by a transmitter, a print job for performing printing based on image data generated by the raster image processing to a printing apparatus;

performing a rebooting process of the image processor based on detecting an error of the image processor; and after the rebooting process is performed, specifying the print job whose transmission has been started before the rebooting process is performed but not completed and starting retransmission of at least the specified print job to the printing apparatus without receiving a retransmission instruction of the image data from a user.

11. An image data transmission method, comprising:
performing raster image processing on print data, wherein the RIP processing is performed by an image processor;

transmitting a print job for performing printing based on image data generated by the raster image processing to a printing apparatus;

performing a rebooting process of the image processor based on detecting an error of the image processor; and after the rebooting process is performed, specifying the print job whose transmission has been started before the rebooting process is performed but not completed and starting retransmission of at least the specified print job to the printing apparatus without receiving a retransmission instruction of the image data from a user.

12. The image data transmission method according to claim 11, further comprising performing a predetermined notification to the image processor, wherein the error is detected based on lack of a response to the predetermined notification.

13. The image data transmission method according to claim 11, wherein the print data is PDL (Page Description Language) data.

14. The image data transmission method according to claim 11, further comprising:

transmitting a command for shifting the printing apparatus from an error state to a state where the error state is resolved after the error of the image processor is detected by the detector; and starting retransmission of the image data to the printing apparatus after the command is transmitted.

* * * * *